Figure 1:
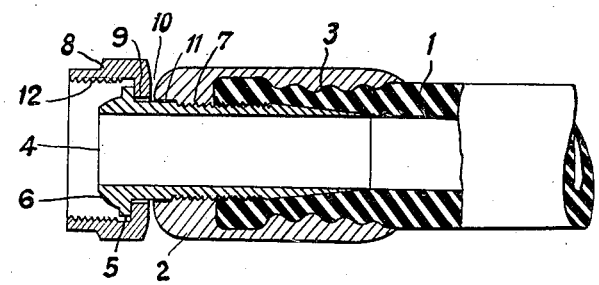

Dec. 16, 1941.　　　R. KAISER　　　2,266,211
HOSE CONNECTION
Filed June 21, 1939

Inventor
Rudolf Kaiser
By
Attorney

Patented Dec. 16, 1941

2,266,211

UNITED STATES PATENT OFFICE 2,266,211

HOSE CONNECTION

Rudolf Kaiser, Hohen-Neuendorf, near Berlin, Germany, assignor to Michigan Patents Corporation, Jackson, Mich.

Application June 21, 1939, Serial No. 280,319
In Germany June 30, 1938

1 Claim. (Cl. 285—86)

The invention relates to a hose connection in which the end of the hose to be connected with a pipe nipple or with another hose is held between an inner nipple and an outer nipple, which are screwed together.

Many requirements are placed on such screw connections for hose, the complying with all of which presents considerable difficulties. In particular, however, the clear diameter of the inner nipple must be equal to the inner diameter of the hose, so that the area of flow is not reduced at the position of the joint.

A particular construction of screw connections for hoses has fulfilled all requirements in a satisfactory manner, but in certain cases there has arisen a fresh disadvantage which consisted in the inner nipple breaking at the point where the outer nipple fits on, if the hose screw connection is fitted in the vicinity of vibrating masses. It has appeared impossible up to the present to obviate this disadvantage, since the obvious idea of enlarging the cross-section of the inner nipple at the point subject to danger, could not be carried out, since this would have as a result a narrowing of the cross-section of flow. The use of material of greater strength does not, on the other hand, promise any success since the fractures hitherto observed have been attributed to fatigue phenomena due to the constant vibration and such fatigue phenomena occur even with materials of the greatest strength, or at least are not entirely excluded. Since, however, such screw connections for hoses appertain to piping serving for the hydraulic control of machines and the like, and thus represent parts important to life, even the possibility of fractures due to fatigue must be excluded.

The invention consequently aims at excluding the cause of the occurrence of these fractures. There has been established as this cause that the first turn of the thread which serves as connection between the inner and outer nipples, exerts a kind of notch effect. This recognition has been utilized with this invention by the provision of cylindrical fitting surfaces in front of the thread on both nipples. These fitting surfaces permit the oscillations unavoidably transmitted to the inner nipple being transmitted on to the outer nipple without injurious consequences being shown, since there is no longer any endangered cross-section.

It has furthermore been found that the screw connection for hoses just described may be further improved for many purposes and in particular may be made cheaper to produce.

For it has been found that cylindrical fitting surfaces are frequently very difficult to make with sufficient adherence to measurement, in particular in the case of mass production by means of automatic machines.

On the other hand, however, the adherence to measurements must be very exact, since with a certain, or excessive play, the bending moments occurring are greater than if the fitting surfaces had not been provided. Consequently, just the opposite has been attained to that which should have been attained. Furthermore, the inner diameter of the outer nipple must not be too small at the point where the fitting surface is provided, as otherwise the screwing could not take place satisfactorily in practice. For these reasons, in the production of cylindrical fitting surfaces much work is necessary which takes up considerable time and causes a great deal of waste.

All these difficulties in particular occurring in the case of mass production, are obviated in a simple manner by the fitting surfaces being made conical, so that for example a close connection is practically always ensured.

The production of the nipples according to the present invention therefore takes place with the aid of ordinary machine tools or the like without difficulty. The fitting surfaces are preferably made only comparatively slightly conical.

Further features of the present invention will be seen from the following description of constructions of the hose screw joints or connections, which are represented diagrammatically in the accompanying drawing.

Figure 2:
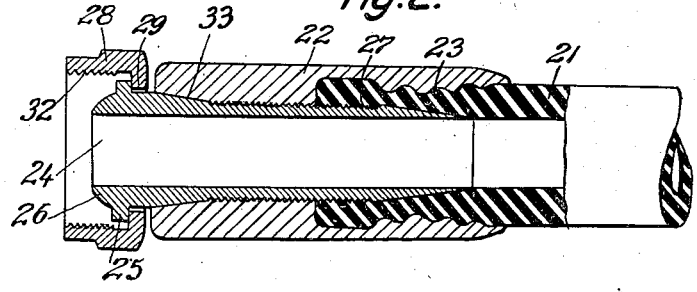

Figure 1 is a longitudinal section of a hose screw connection in accordance with the invention and Figure 2 is a longitudinal section through a hose connection with conically formed fitting surfaces.

In the construction shown in Figure 1, I is the end of a hose which is to be provided with a metallic cap in order to permit the connection with a pipe nipple or the like. To this end, there is fitted over the end of the hose the outer nipple 2 serving as hose fitting and which represents a tube piece thickened inwardly at its front end. The right hand extension of the nipple is provided with an inner thread 3. There is screwed into the nipple 2 and the hose end 1, an inner nipple 4, having at its front end a flange 5 and a conical sealing surface 6. On its circumference nipple 4 is provided with a screw thread 7, fitting a corresponding tapping in the thickened head of the outer nipple 2. The inner diameter of the inner nipple 4 is the same over its whole length and corresponds to the inner diameter of the hose 1. The outer diameter of the nipple 4 however becomes gradually smaller in the direction of the hose so that the walls of the nipple run to a point.

A cap nut 8 fits with its inwardly projecting flange 9 behind the flange 5 of the nipple 4. By means of the thread 12 of the cap nut 8 the hose 1 can be connected with a pipe provided with an outer thread by the joint surface 6 of the nipple being pressed on to the correspondingly formed end surface of the pipe piece (not shown).

The inner thread 3 of the outer nipple 2 is preferably made rounded and so that the threads are at their highest at the centre over the whole length of the thread and fall away towards both sides. If the thread 7 is right-handed then the thread 3 is preferably left-handed, so that the assembling of the pipe connection is facilitated.

The fractures of the inner nipple 4, mentioned at the outset have always taken place at the point marked 10. Consequently to remedy this drawback the cylindrical fitting surfaces 11 have been provided in front of the thread 7. It has been found that even comparatively short fitting surfaces are sufficient to transmit even strong vibrations from the inner nipple to the outer nipple without any injurious consequences.

It will furthermore be seen from Figure 1 that the arrangement of the fitting surface 11 allows all the other constructional parts of the hose connection to remain entirely unaltered and in particular the clear inner diameter of the hose connection remains the same.

With the construction according to Figure 2, 21 indicates the end of a hose which is to be provided with a metallic head piece allowing the connection with a tube nipple or the like. Over the end of the hose is fitted the outer nipple 22 serving as a fitting which forms a tube thickened inwardly at the front end. The extension of the nipple shown on the drawing towards the right is provided with an inner thread 23.

Into the nipple 22 and the end 21 of the hose is screwed an inner nipple 24 having at its front end a flange 25 and a conical sealing surface 26. This nipple is provided on its circumference with a screw thread 27 fitting into a corresponding tapped thread in the thickened front end of the outer nipple 22. The clear inner diameter of the inner nipple 24 remains unaltered over its whole length and corresponds to the inner diameter of the hose 21. The outer diameter of the nipple is, however, made gradually smaller in the direction towards the hose, so that the walls of the nipple run to a fine edge.

A cap nut 28 fits with an inwardly projecting flange 29 behind the flange 25 of the nipple 24. By means of the screw-thread 32 of the cap nut, the hose 21 can be connected to a pipe piece provided with an external thread by the sealing surface 26 of the nipple being pressed on to the correspondingly formed end surface of the pipe piece.

The inner thread 23 of the outer nipple 22 is preferably made as a round thread and so that the threads are at the highest in the centre over the whole extent of the thread and fall away towards both sides. If the threads 32 and 27 are right-handed, then the thread 23 is preferably made left-handed, so that the assembling of the pipe joint is facilitated.

The slightly conical fitting surfaces provided according to the invention are indicated by 33 and these are arranged in front of the thread 27, that is, between the last thread thereof and the end of the flange 25 facing it.

The pipe connection according to the invention can also be used with a pipe joint not made by screwing, e. g. a soldered connection or a clamping connection.

What I claim is:

A fitting adapted to be secured to a flexible hose designed for use in locations where subjected to excessive vibration, comprising an inner nipple, an outer nipple, a screw thread on said outer nipple, a screw thread on said inner nipple engaging the threads of said outer nipple, said outer nipple and said inner nipple being adapted to have a hose wedgedly clamped therebetween, an unthreaded recess in said outer nipple at the outer end of its screw threaded portion, an unthreaded portion on said inner nipple having an external diameter in excess of the root diameter of its threaded portion, said unthreaded portions of said inner and outer nipples telescoping when said threaded portions of said inner and outer nipples are engaged to the extent permitted by the wedging engagement of the nipples with the hose, the engagement of said unthreaded portions serving to prevent localization of vibrational stresses in the zone of the outermost thread of the inner nipple.

RUDOLF KAISER.